United States Patent [19]

Fox et al.

[11] Patent Number: 5,055,531
[45] Date of Patent: Oct. 8, 1991

[54] PROCESS FOR THE PREPARATION OF POLYESTER/POLYCARBONATE COPOLYMERS

[75] Inventors: Daniel W. Fox, Pittsfield; Edward N. Peters, Lenox; Gary F. Smith; Paul D. Sybert, both of Pittsfield, all of Mass.

[73] Assignee: General Electric Company, Pittsfield, Mass.

[21] Appl. No.: 947,660

[22] Filed: Dec. 30, 1986

[51] Int. Cl.$^5$ .............................................. C08G 63/64
[52] U.S. Cl. .................................. 525/439; 524/537; 524/539
[58] Field of Search ........................................ 525/439

[56] References Cited

U.S. PATENT DOCUMENTS

| | | | |
|---|---|---|---|
| 3,218,372 | 11/1965 | Okamura et al. | 260/860 |
| 3,299,172 | 1/1967 | Schade et al. | 260/860 |
| 3,413,379 | 11/1968 | Schade et al. | 260/860 |
| 4,358,568 | 11/1982 | Fox | 525/439 |
| 4,367,317 | 1/1983 | Fox | 525/439 |
| 4,461,877 | 7/1984 | Fox | 525/439 |
| 4,507,442 | 3/1985 | Fox et al. | 525/439 |

FOREIGN PATENT DOCUMENTS 1569296  6/1980  United Kingdom .

OTHER PUBLICATIONS

Billmeyer F. W. *Textbook of Polymer Science* John Wiley & Sons, New York p. 231 1971.

*Primary Examiner*—Patricia Short
*Attorney, Agent, or Firm*—Hedman, Gibson, Costigan & Hoare

[57] ABSTRACT

Copolymers are prepared by the interaction of a melt mix comprising a high molecular weight poly(alkylene arylate) resin with a high molecular weight polycarbonate or polyester carbonate and a catalyst, such as diphenyl phosphate. The copolymers are tough and are useful as molding compounds and are capable of maintaining dimensional stability at temperatures approaching their singale glass transition temperature. The copolymers are characterized by having substantially no content of polyester homopolymer and a ratio of arylate linkages to dihydric phenol arylate linkages of not substantially less than 20:1.

13 Claims, No Drawings

PROCESS FOR THE PREPARATION OF POLYESTER/POLYCARBONATE COPOLYMERS

This invention relates to the preparation of copolymers by the interaction of a melt mix of a high molecular weight polyester polymer, such as a poly(alkylene arylate) and a high molecular weight polycarbonate or polyester carbonate in the presence of a catalyst. These copolymers are useful to prepare molded articles.

BACKGROUND OF THE INVENTION

In Fox et al., U.S. Pat. No. 4,507,442, it is disclosed that diprimary dialcohol polyesters, such as poly(ethylene arylates) and more specifically, poly(ethylene terephthalates) are not compatible with poly(bisphenol-A carbonates), but that by coreacting a blend or melt mix of the two, they can be compatibilized. However, it is essential to heat at 270° C. under a high vacuum or in an inert atmosphere to obtain a copolymer having a single glass transition temperature. Moreover, while the copolymers obtained in '442 are eminently suitable for many uses, there is a tendency, in some instances, to develop a yellow color, particularly over a long time.

Okamura et al., U.S. Pat. No. 3,218,372, disclose molding compositions comprising polycarbonates and polyalkylene terephthalates, e.g., poly(bisphenol-A carbonate and poly(ethylene terephthalate) whereby the two polymers are melt-mixed under a nitrogen atmosphere. Although the compositions are used for molding, they are merely melted together under nitrogen, e.g., at 290° C., and they are not described to be copolymers, but merely a "uniform mixture".

Schade et al., U.S. Pat. Nos. 3,299,172 and 3,413,379 disclose processes for the preparation of linear thermoplastic mixed polyesters by reacting a diaryl arylate, a poly(alkylene arylate) and, optionally, a diaryl carbonate in the presence of a transesterification and polycondensation catalyst. The materials produced by these processes are described to be "mixed polyesters" and they are not copolycopolymers containing poly(aryl carbonate) units, although isolated mono aryl carbonate linkages might be produced if a diaryl carbonate is included in the reaction mixture.

In Mercier et al., U.K. Patent No. 1,569,296, it is disclosed that mixing aromatic polyesters and aromatic polycarbonates in the molten state induces a reaction leading to fast degradation of the polymers, but if an acidic stabilizing additive is then added, a useful product can be obtained, but in which the polyester and the polycarbonate are only "partly copolymerized". The stabilizing additive serves to prevent further reaction and is therefore, not a catalyst. All of the additives exemplified in U.K. '296 are acidic, such as a phosphorus compound or a carboxylic acid. Moreover, such compositions will have three glass transition temperatures, one each for the respective homopolymers, and one for the copolymer. In terms of ultimate physical properties and appearance, as well as environmental resistance, such compositions are deficient, especially in comparison with the compositions of the Fox et al. patent which have only a single glass transition temperature. Such compositions also tend to become yellow with time.

In the current state of the art, therefore, it would be desirable to provide a convenient method to prepare novel low color co-polymers having a single glass transition temperature by melt extruding a polycarbonate and/or a polyester carbonate, a polyester and a catalyst, thus avoiding the need to use a subsequent step comprising high vacuum heating or heating in an inert atmosphere. Such novel copolymers and processes for their preparation are provided by the present invention.

SUMMARY OF THE INVENTION

In accordance with the present invention are provided copolymers of high molecular weight poly(alkylene arylates) and high molecular weight poly(dihydric phenol carbonates) or poly(dihydric phenol arylate/carbonates) in the proportion of 1 percent to 40 percent of the former to 99 percent to 60 percent of the latter, the resulting copolymers possessing a single glass transition temperature, having substantially no content of poly(alkylene arylate)homopolymers and having a ratio of alkylene arylate linkages to dihydric phenol arylate linkages of not substantially less than about 20:1.

In contrast with the foregoing, the prior art Fox et al. patent provides copolymers in which the ratio of alkylene arylate linkages to dihydric phenol linkages is of the order of only 10:1, as will be shown in the comparative examples hereinafter.

Also in accordance with the present invention, is provided a process for the preparation of a high molecular weight copolymer which comprises reacting together in the molten state, at a temperature between 245° C. and 315° C. at a time interval between 0.1 minute and 40 minutes, and in the presence of a basic catalyst, a mixture of a high molecular weight poly(alkylene arylate) and a high molecular polydihydric phenol carbonate) and/or poly(dihydric phenol arylate/carbonate in the proportion of 1 percent to 40 percent of the former to 99 percent to 60 percent of the latter, the resulting copolymer possessing a single glass transition temperature, having substantially no content of poly(alkylene arylate) homopolymers and having a ratio of alkylene arylate linkages to dihydric phenol arylate linkages of not substantially less than about 20:1, and then added to the molten mixture an effective amount of an acidic stabilizing additive. The resulting copolymer contains very little or at most only trace amounts of the respective copolymers.

Further provided by this invention are novel copolymers produced by the process described above, as well as impact-modified such compositions and/or reinforced compositions.

DETAILED DESCRIPTION OF THE INVENTION

Polyesters suitable for use herein are derived from an aliphatic, aliphatic ether or cycloaliphatic diol, or mixtures thereof, preferably containing from about 2 to about 10 carbon atoms, and one or more aromatic or cycloaliphatic dicarboxylic acids. Preferred polyesters are derived from an aliphatic diol and an aromatic dicarboxylic acid having repeating units of the following general formula:

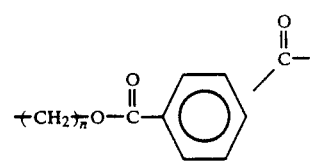

wherein n is an integer of from 2 to 10, preferably 2 to 4. The most preferred polyesters are poly(ethylene terephthalate) and poly(butylene terephthalate).

Also contemplated herein are the above polyesters with additional amounts of polyols and/or acids in the amounts of from 0.5 to 50 wt. percent based on the total composition. The acids can be aliphatic or cycloaliphatic with the number of carbon atoms ranging from 2 to 20. Likewise, the glycols can be cycloaliphatic or aliphatic with the number of carbon atoms covering the same range. Polyalkylene ether glycols can also be used where the alkylene portion has from 2 to 10 carbon atoms and the entire glycol portion varies in molecular weight from 100 to 10,000. All such polyesters can be made following the teachings of, for example, U.S. Pat. Nos. 2,465,319 and 3,047,539.

Also useful are the polyesters which are derived from a cycloaliphatic diol and an aromatic dicarboxylic acid. These are prepared, for example, by condensing either the cis-or trans-isomer (or mixtures thereof), for example, 1,4-cyclohexanedimethanol with an aromatic dicarboxylic acid so as to produce a polyester having recurring units of the following formula:

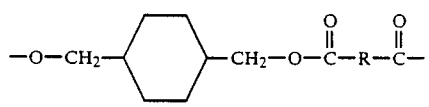

wherein the cyclohexane ring is selected from the cis- and trans-isomers thereof and R represents an aryl or cycloaliphatic radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, etc., and mixtures of these. Acids containing fused rings can also be present, such as in 1,4- or 1,5-naphthalenedicarboxylic acids. Also contemplated are cycloaliphatic diacids, such as cyclohexane dicarboxylic acid. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

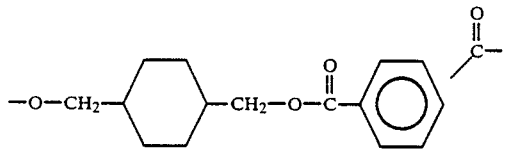

Still another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexane-dimethanol and an alkylene glycol with an aromatic dicarboxylic acid so as to produce a copolyester having units of the following formula:

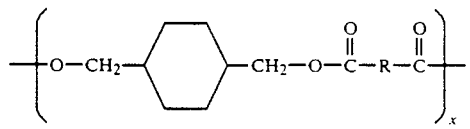

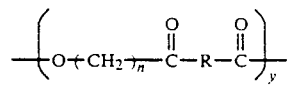

wherein the cyclohexane ring is selected from the cis- and trans-isomers thereof, R is as previously defined, n is an integer of 2 to 10, the x units comprise from about 1 to 99 percent by weight, and the y units comprise from about 99 to about 1 percent by weight.

Such a preferred copolyester may be derived from the reaction of either the cis- or trans-isomer (or mixtures thereof of 1,4-cyclohexanedimethanol and ethylene glycol with terephthalic acid in a molar ratio of 80:20:100. These copolyesters have repeating units of the following formula:

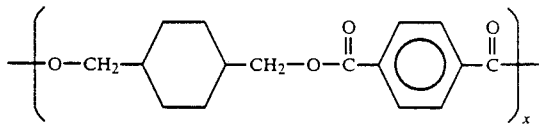

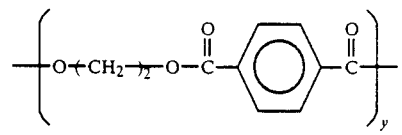

wherein x and y are as previously defined.

The polyesters described herein are either commercially available or they can be produced by methods known in the art, including those set forth in U.S. Pat. No. 2,801,466.

The polyesters employed in the practice of this invention will usually have an intrinsic viscosity of from about 0.4 to about 2.0 dl./g., as measured in a 60:40 phenol:tetrachloroethane mixture, or similar solvent at 23°-30° C.

A preferred polyethylene arylate which is employed in the invention is high molecular weight polyethylene terephthalate having an intrinsic viscosity (I.V.) of at least about 0.5 dl./g. or greater as measured in a solvent mixture of 60 parts by weight of phenol and 40 parts by weight of tetrachloroethane at 25° C. This particular solvent mixture is necessary for determining the intrinsic viscosity (I.V.) of polyethylene arylate, alone, or in incompatible blends with polycarbonates. Also preferred are poly(1,4-butylene terephthalate) and poly(1,4-cyclohexanedimethanol terephthalate) either also having an I.V. of at least about 0.5 dl./g.

Polycarbonate and polyester carbonates useful in this invention are especially wholly aromatic. These can be made by those skilled in the art or obtained from various commercial sources. They may be prepared by reacting dihydric phenol with a carbonate precursor, such as phosgene, a haloformate or a carbonate ester, or with such and an arylate precursor, e.g., an ester, free acid or acid halide of isophthalate and/or terephthalate acid. Typically, they will have structural units of the formula:

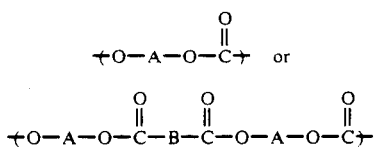

wherein A is a divalent aromatic radical of the dihydric phenol employed in the polymer producing reaction, and B is an divalent aromatic radical of the difunctional aromatic acid or derivative. Preferably, the aromatic carbonate or aromatic arylate/carbonate polymers have an intrinsic viscosity ranging from 0.30 to 1.0 dl./g. (measured in methylene chloride at 25° C.). By dihydric phenols is meant mononuclear or polynuclear aromatic compounds containing two hydroxy radicals, each of which is attached to a carbon atom of an aromatic nucleus. Typical dihydric phenols include 2,2-bis-(4-hydroxy-phenyl)propane; 2,2-bis-(3,5-dimethyl-4-hydroxyphenyl)propane, 4,4'-dihydroxydiphenyl ether, bis(2-hydroxyphenyl)methane, mixtures thereof and the like. The preferred aromatic carbonate polymer is a homopolymer derived from 2,2bis-(4-hydroxyphenyl)-propane(bisphenol-A). The preferred aromatic arylate/carbonate polymers are derived from 2,2-bis-(4-hydroxyphenyl) propane (bisphenol-A), a mixture of iso- and terephthalate acids and phosgene or a phosgene precursor.

For a high molecular weight poly(bisphenol-A carbonate) or poly(bisphenol-A iso- terephthalate carbonate), it is preferred to employ one having an intrinsic viscosity (I.V.) of at least about 0.45 dl./g. as measured in chloroform at 25° C.

The relative amounts of the polymers can and usually do vary widely in the blend, with particular amounts depending on specific requirements and the nature of the polymers being employed.

Thus, the poly(bisphenol-A carbonate) may constitute 99 to 60 percent of the blend and the poly(alkylene arylate) 1 to 40 percent of the blend. However, it is most preferred to employ proportions of the poly(alkylene arylate) and the poly(bisphenol-A carbonate) or ester carbonate comprising 2 to 25 percent of the former and 75 to 98 percent of the latter. Best amounts in a given instance will be readily determinable by those skilled in the art.

The basic catalysts useful to polymerize the poly(alkylene arylate) and the poly(bisphenol-A carbonate) and/or ester carbonate include among others, alkaline earth metal oxides. Suitable, but not limiting, are magnesium oxide, calcium oxide, barium oxide and zinc oxide. Especially preferred is magnesium oxide.

Other basic catalysts can be used including alkyl titanates, preferably tetraoctyl titanate and the salts of aryl phosphinic acid. Especially preferred as a basic catalyst is sodium benzene phosphinate (SBP) having the formula:

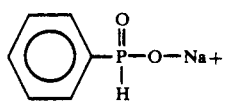

The amount of basic catalyst employed can vary broadly. An amount in the range of from about 0.0005 to about 0.5 percent by weight is generally employed, however, less, or more, can be used. As will be shown in the comparative examples, melt mixing without a catalyst even for 60 minutes at 270° C., still provides a simple mixture of the two homopolymers, as evidenced by two glass transition temperatures.

In a preferred feature of this invention, the range of the preferred sodium benzene phosphinate catalyst to effect copolymerization is from 0.001 parts to 0.1 parts based on the total polycarbonate/polyester content. The preferred range for PBT based material is 0.001 to 0.07 parts SBP and for PET polymers 0.005 to 0.09 parts SBP.

The stabilizing additives used in the process of this invention herein are acidic compounds. Also known as quenching agents, quenchers and anti-jumbling agents, these serve to stop the polymerization reaction between the polymers by "quenching" or inhibiting the catalyst. Failure to quench the catalyst typically results in the continued accelerated interpolymerization and degradation of the polymers, leading to a low molecular weight material of little commercial value.

A first class of stabilizing additives, which may be used in the process of the invention comprises the phosphorus containing derivatives, such as preferably the organic phosphites, it being understood that this term designates all the esters of phosphorous acid including those likely to appear under other forms. Thus, for instance, the phosphites used according to the invention include the diphosphites, which are likely to convert into phosphonates and are nevertheless usually called phosphites. But other phosphorous compounds can also be used, such as metaphosphoric acid, arylphosphinic and arylphosphonic acids. Preferred additives for carrying out the invention are those in which the phosphorous atom carries at least one and preferably two aromatic substitutents such as the phenyl radical, on one hand, and diphosphites, and in particular those in which the carbon atom carries two alkyl radicals comprising from 4 to 30 carbon atoms, on the other hand. Other suitable additives may be selected from all organic phosphites having the following formula: $RP(OR)_3$, wherein each R may be a hydrogen atom, an alkyl radical having from 1 to 20 carbon atoms, or an aryl radical having from 6 to 20 carbon atoms, and wherein at least one of said R radicals is such an alkyl or aryl radical.

Generally, the use of phosphites as the additives shows various advantages, in particular that of being in the form of liquids or of solids having a low melting point, which renders their incorporation with the polymer mixture easier. Moreover, the large number of compounds belonging to the class of phosphites, permits selection of the additive so as to provide the composition with additional desirable properties, e.g., fire resistance. Of course, mixtures of such additives may be used in the compositions of the invention.

Another class of suitable additives is comprised of the carboxylic acids, i.e., organic compounds the molecule of which comprises at least one carboxy group.

Suitable acids are the organic compounds of the aromatic series comprising at least two, or preferably three or four, carboxy groups as substituents on a benzene ring.

The acids may be derived from the corresponding anhydrides. Thus, anhydrides may also constitute the additives of the invention, preferably provided that water is present in sufficient amounts to ensure at least partial hydrolysis of the anhydrides.

Specific additives from this class may be non aromatic acids such as stearic acid, or preferably aromatic acids such as terephthalic, trimellitic, trimesic, pyromellitic acids. They may further be anhydrides such as the anhydride of tetrahydrofuran-tetracarboxylic acid or the anhydrides of aromatic acids comprising at least three carboxy groups, such as trimellitic, pyromellitic, and naphthalenetetracarboxylic acids, such anhydrides being preferably partially hydrolyzed.

The percentage of additives introduced into the composition according to the invention is, preferably, from 0.1% to 1% by weight, with respect to the total polymer weight; however, other percentages, usually between 0.1% and 5% by weight, can be resorted to. More details are given, if desired, in the above-mentioned U.K. 1,569,296.

Glass transition temperatures are measured, for example, on a Perkin-Elmer DSC-II instrument, or on any other instrument known to those skilled in this art. The ratio of alkylene arylate to dihydric phenol arylate linkages is measured by techniques known to those skilled in this art also. One convenient way is to use Carbon-13 NMR analysis. This is done as follows:

The samples are dissolved in $CDCl_3$ with a small amount of chromium trisacetylacetonate present as a relaxation reagent. The NMR spectra can be obtained using a Varian XL-300 with carbon at 75.4MHz. The sweep width is 20,000Hz and the number of transients accumulated is approximately 9000. The acquisition time is 0.75 sec. Gated decoupling is used and the pulse delay is 5.0 sec. The ratio of the arylate carbonyls were obtained by integration (for PET-Polycarbonate Copolymers: the alkylene arylate carbonyl is at 165.1 ppm, and the dihydric phenol arylate carbonyl is at 164.1 ppm).

Extruder processing temperatures may range from 230° C. to 310° C. A preferred range is 240°-275° C. Extrusion may be conducted using conventional methods and equipment, e.g., WP 30 mm twin screw extruder. Typically the twin screw extruder is a more efficient machine than a single screw extruder.

Illustratively, a blend of poly(bisphenol-A carbonate), 70 percent by weight, and poly(ethylene) terephthalate, 30 percent by weight, can be polymerized by extrusion through a simple extruder at 300° C. during 3.5 min. in the presence of 0.1 to 0.5 percent by weight, magnesium oxide catalyst to produce a copolymer characterized by a single Tg of 117° C. and no Tm. The same blend without a catalyst, such as magnesium oxide, will typically produce a copolymer that exhibits dual glass transition temperatures, e.g., 80° C. and 149° C. and a melting point temperature (Tm) of, for example, 239° C.

The compositions of this invention can be formed into useful articles by any of the known methods for shaping engineering thermoplastics, special mention being made of extrusion and injection molding. They can also be formulated to contain additives, such as reinforcements, flame retardants, pigments, dyes, stabilizers, mold releases, impact improvers, and the like, in effective amounts. As reinforcements can be mentioned glass fibers, asbestos, Wollastonite, and the like, in amounts of from 1 to 40% by weight or more, preferably from 5 to 30%, and especially preferably, glass. Impact improvers generally comprise acrylate and arylate copolymers, either per se or in the form of core-shell grafts. Ethylene/ethyl acrylate, methyl methacrylate/butyl acrylate are typical impact improvers, generally in amounts between 2.5 and 25, more usually 5 to 10 parts per 100 parts by weight of copolymer in the composition.

DESCRIPTION OF THE PREFERRED EMBODIMENTS

The following examples illustrate the present invention. They are not to be construed to limit the claims in any manner whatsoever.

EXAMPLE 1

A mixture of 75 parts LEXAN® 101 poly(bisphenol-A carbonate) and 25 parts Tenite® 7352, poly(ethylene terephthalate) PET, available from the Eastman Chemical Products, were melt mixed in a Haake mixing bowl at 90 rpm with melt temperatures of 270° C. A similar sample with 0.05% sodium benzene phosphinate (SBP) catalyst was similarly mixed. The mixture containing catalyst rapidly cross-polymerized to yield a single Tg copolymer, 118° C., within 3 minutes. The mixture without catalyst still exhibited 2 Tg's, 76° and 136° C., after 1 hour of mixing. The former material had a ratio of ethylene terephthalate to bisphenol-A terephthalate units of greater than 20:1.

EXAMPLES 2-4

Mixtures and catalysts were processed according to the procedure of Example 1 with the exception that a temperature of 310° C. was used with the tetraoctyl titanate, magnesium oxide, and zinc oxide catalysts. Compositions and properties are set forth in Table 2.

TABLE 2

| Polycarbonate/Polyester Copolymers | | | |
|---|---|---|---|
| Example | 2 | 3 | 4 |
| Compositions (parts by weight) | | | |
| Poly(bisphenol A carbonate)[a] | 80 | 75 | 75 |
| Poly(ethylene terephthalate)[b] | 20 | 25 | 25 |
| Catalyst | | | |
| Tetraoctyl titanate | 0.3 | — | — |
| Magnesium oxide | — | 0.5 | — |
| Zinc oxide | — | — | 0.5 |
| Properties | | | |
| Heating time | | | |
| Tg (min.) | 10 | 10 | 30 |
| Tg (°C.) | 122 | 119 | 118 |

[a]LEXAN ® 101, General Electric Company
[b]VALOX ® 295, General Electric Company The results indicate that fast catalyzed polymerization can be obtained leading to copolymers with single glass transition temperatures.

EXAMPLE 5

A mixture of 80 parts LEXAN® 101 polycarbonate, General Electric Company, 20 parts Tenite® 7352 PET, available from the Eastman Chemical Products, and 0.05% sodium benzene phosphinate (SBP) was extruded on a Werner-Pfleiderer (WP) 30 mm twin screw extruder with melt temperatures of 260° C., at 150 rpm. A single Tg (123° C.) material was obtained. As an anti-jumbling agent, phenyl phosphonic acid, 0.2 parts per hundred of resin, was added and the composition was re-extruded. The copolymer was then injection molded and physical properties determined. The properties for this molded article are set forth below:

Tg: 123° C.

HDT: 215° F., 102° C.
Specific gravity: 1.226
Tensile modulus: 413,000 psi

EXAMPLE 6

A mixture of 90 parts LEXAN ® 101 polycarbonate and 10 parts of VALOX ® 315 poly(1,4-butylene terephthalate) with 0.01 parts sodium benzene phosphinate (SBP) was extruded on a WP 30 mm twin screw extruder with melt temperatures of 260° C. at 150 rpm to obtain a single material with a single Tg of 130° C. The residence time was approximately 1 minute. The same 90/10 mixture of polycarbonate and PBT without SBP yielded a blend with two Tgs, 139° C. and 48° C. The copolymer was next extruded with 0.2 parts per hundred of resin of phenyl phosphonic acid to quench the catalyst. The copolymer was injection molded and physical properties were measured as follows:

Tg (°C.): 130
Notched Izod, ft-lb/in: 2.0
HDT, 264 psi: 105

EXAMPLES 7-9

Using the processing procedure given in Example 6 but varying the composition of polycarbonate (LEXAN ® 101) and PBT (VALOX ® 315) copolymers were prepared and their intrinsic viscosities determined in 60/40 w/w phenol-tetrachloroethane at 30° C.

Compositions and the intrinsic viscosities are set forth in Table 3.

TABLE 3

| | Polycarbonate/Polyester Copolymers | | |
|---|---|---|---|
| Example | 7 | 8 | 9 |
| Compositions (parts by weight) | | | |
| Poly(bisphenol A carbonate) | 93 | 90 | 80 |
| Poly(1,4-butylene terephthal te) | 7 | 10 | 20 |
| Sodium benzene phosphinate | .01 | .01 | .01 |
| Properties | | | |
| Tg (°C.) | 135 | 130 | 110 |

EXAMPLES 10-15

Using the procedure of Example 6, but varying the molecular weight of the polycarbonate and the poly(butylene terephthalate), copolymers were prepared and their intrinsic viscosities were measured in 60/40 phenol/TCE. Composition and properties are set forth in Table 4.

TABLE 4

| | Polycarbonate/Polyester Copolymers | | | | | |
|---|---|---|---|---|---|---|
| Example | 10 | 11 | 12 | 13 | 14 | 15 |
| Composition (parts by weight) | | | | | | |
| Poly(bisphenol-A carbonate) | | | | | | |
| Higher MW grade[a] | 90 | 90 | — | — | — | — |
| Middle MW grade[b] | — | — | 90 | 90 | — | — |
| Lower MW grade[c] | — | — | — | — | 90 | 90 |
| Poly (butylene terephthalate) | | | | | | |
| Higher MW grade[d] | 10 | — | 10 | — | 10 | — |
| Lower MW grade[e] | — | 10 | — | 10 | — | 10 |
| Properties | | | | | | |
| Intrinsic Viscosity (IV) (dl/g) | 0.63 | 0.67 | 0.59 | 0.63 | 0.53 | 0.59 |

[a]LEXAN ®101, General Electric Company, IV = 0.58 in chloroform
[b]LEXAN ®141, General Electric Company, IV = 0.53 in chloroform
[c]LEXAN ®121, General Electric Company, IV = 0.48 in chloroform
[d]VALOX ®295, General Electric Company, IV = 1.10 in 60/40 phenol/TCE
[e]VALOX ®315, General Electric Company, IV = 0.78 in 60/40 phenol/TCE Copolymers according to this invention are thus obtained.

Comparative experiments were carried out to provide evidence that the products prepared according to this invention are different than those prepared according to the prior art.

A polycarbonate-PET copolymer was prepared from 75 parts of Lexan ® 101 polycarbonate from General Electric Company and 25 parts Tenite ® 7352 PET, available from Eastman Chemical Products under a nitrogen sweep according to the method of D. W. Fox, B. A. Kaduk, and J. B. Starr, Jr., U.S. Pat. No. 4,367,317. The amount of copolymer (designated Comparative Example A) was calculated using $^{13}$C NMR as described above.

A polycarbonate-PET copolymer was prepared from 75 parts of Lexan ® 101 polycarbonate from General Electric Company, 25 parts Tenite ® 7352 PET, available from Eastman Kodak Company, and 0.05% sodium benzene phosphinate (SBP) according to Example 5 above. The amount of copolymer (Example 5) was calculated using $^{13}$C NMR. The results are set forth in Table 4:

TABLE 4

$^{13}$C Data On Polyester-Polycarbonate Copolymers

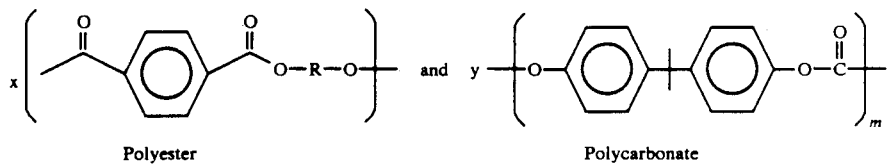

Polyester         and         Polycarbonate

TABLE 4-continued

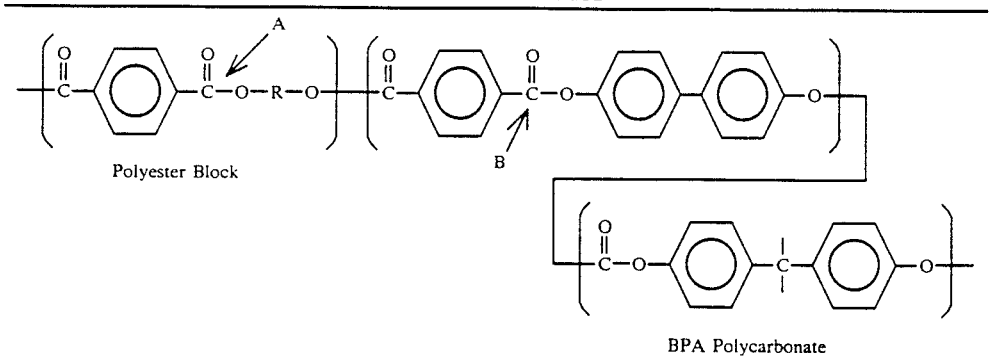

Polyester Block

BPA Polycarbonate

| Method of Preparation | Composition (phr) PET | Composition (phr) PC | Ratio of Arylate Carbonyls Alkylene Arylate Carbonyl (A) | Ratio of Arylate Carbonyls Dihydric Phenol Arylate Carbonyl (b) |
|---|---|---|---|---|
| Comparative Example A | 25 | 75 | 10 | 1 |
| Example 5 | 25 | 75 | 30 | 1 |

EXAMPLE 16

(a) A mixture of 90 parts of Lexan ® 101 poly(bisphenol-A carbonate), 10 parts of Valox ® 315 poly(1,4-butylene terephthalate) and 0.01 parts of sodium benzene phosphinate was extruded on a Werner and Pfleiderer 30 mm twin screw extruder with melt temperature of 260° C. at 150 rpm to obtain a copolymer with a single Tg of 130° C.

(b) The copolymer of step (a) was subsequently re-extruded with 0.2 parts of phenyl phosphonic acid and 7.5 parts by weight per 100 parts by weight of resin of an impact modifier comprising 20 parts by weight of ethylene ethyl acrylate copolymer and 80 parts by weight of a core-shell graft copolymer having a rubber butyl acrylate core and a methyl methacrylate thermoplastic shell (Rohm & Haas, Acryloid ®KM-330). An impact modified composition according to this invention was obtained, having properties set forth in the Table which follows Examples 17-23.

EXAMPLES 17-23

The procedures of Example 16 were repeated, substituting copolymer prepared at different ratios and different amounts and types of impact modifiers. The formulations used and the results obtained after molding and testing according to standard procedures are set forth in Table 5:

TABLE 5

| Impact Modified Polycarbonate/Polyester Copolymers | | | | | | | | |
|---|---|---|---|---|---|---|---|---|
| Example | 16 | 17 | 18 | 19 | 20 | 21 | 22 | 23 |
| Composition (parts by weight) | | | | | | | | |
| Copolymer | | | | | | | | |
| Poly(bisphenol-A carbonate) | 80 | 90 | 90 | 90 | 90 | 95 | 95 | 95 |
| Poly(1,4-butylene terephthalate) | 20 | 10 | 10 | 10 | 10 | 5 | 5 | 5 |
| Sodium benzene phosphinate | .01 | .01 | .01 | .01 | .01 | .01 | .01 | .01 |
| Phenyl phosphonic acid | .2 | .2 | .2 | .2 | .2 | .2 | .2 | .2 |
| Core-Shell butyl acrylate/methyl methacrylate[a] | — | — | 7.5 | — | — | 7.5 | 6 | 4 |
| Core-Shell butyl acrylate/methyl methacrylate-ethylene ethyl acrylate | 7.5 | 7.5 | — | 6 | — | — | — | — |
| Core-Shell butadiene/methyl methacrylate[b] | — | — | — | — | 7.5 | — | — | — |
| Properties | | | | | | | | |
| Izod impact strength, ft. lbs./in. | 14 | 17 | 16 | 15 | 15 | 16 | 15 | 14 |
| Heat distortion temp., 264 psi, °F. | 204 | 222 | 226 | 226 | 226 | 235 | 236 | 236 |
| Dynatup Impact, total energy, ft. lbs. | 38 | 40 | 41 | 40 | 40 | 45 | 43 | 43 |

[a]Rohm & Haas, ACRYLOID ® KM330
[b]Rohm & Haas, ACRYLOID ® KM653

EXAMPLES 24-25

(a) A mixture of poly(bisphenol-A carbonate), poly (ethylene terephthalate) and sodium benzene phosphinate is extruded in a 30 mm Werner and Pfleiderer twin screw extruder with a melt temperature of 260° C. to yield a single Tg copolymer according to this invention.

(b) The copolymer prepared in accordance with step (a) is re-extruded with 0.2 parts of phenyl phosphonic acid and 7.5 parts of an impact modifier composition. The parts are molded and tested by standard procedures. The formulations used and the results obtained are set forth in Table 6:

TABLE 6

| Impact Modified Polycarbonate-Polyester Copolymers | | |
|---|---|---|
| Example | 24 | 25 |
| Composition (parts by weight) | | |
| Copolymer | | |

TABLE 6-continued

Impact Modified Polycarbonate-Polyester Copolymers

| Example | 24 | 25 |
| --- | --- | --- |
| Poly(bisphenol A carbonate) | 75 | 80 |
| Poly(ethylene terephthalate) | 25 | 20 |
| Sodium benzene phosphinate | 0.05 | 0.05 |
| Phenyl phosphonic acid | 0.2 | 0.2 |
| Ethylene-ethyl acrylate/core-shell polyacrylate/methyl methacrylate (20:80)[a] | 7.5 | 7.5 |
| Properties | | |
| Notched Izod Impact, ft. lbs/in. | 12.4 | 12.5 |
| Heat Distortion temp., °F. at 264 psi | 223 | 230 |
| Dynatap total energy, ft./lb. | 25.6 | 35 |
| Tensile modulus, psi | 320,000 | 317,000 |
| Tensile strength, psi | 9,700 | 8,450 |
| Flexural modulus psi | 350,000 | 340,000 |
| Flexural strength, psi | 14,000 | 14,000 |

[a] See Example 16.

EXAMPLE 26–30

(a) A copolymer of 90 parts of polycarbonate and 10 parts of poly(1,4-butylene terephthalate) is prepared by the procedure of Example 16, step (a).

(b) The copolymer is re-extruded with phenyl phosphonic acid, glass fibers, and in one case, the KM 330/EEA impact modifier of Example 16, step (b). The formulations used and the results obtained are set forth in Table 7:

TABLE 7

Glass-Reinforced Polycarbonate/Polyester Copolymers

| Example | 26 | 27 | 28 | 29 | 30 |
| --- | --- | --- | --- | --- | --- |
| Composition (parts by weight) | | | | | |
| Copolymer, 90/10 PC/PBT | 100 | 100 | 100 | 100 | 100 |
| ⅛ glass fibers OCF 405 AA | 0 | 9.1 | 10.6 | 23.1 | 15.7 |
| Phenyl phosphonic acid | .2 | .2 | .2 | .2 | .2 |
| ethylene/ethylacrylate butyacrylate/methyl methacrylate | — | — | — | — | 5.9 |
| Properties | | | | | |
| Notched Izod Impact strength, ft. lbs/in. | 2.0 | 1.2 | 1.3 | 1.3 | 4.1 |
| Flexural modulus, psi | 320,000 | 451,000 | 539,000 | 626,000 | 517,000 |
| Heat distortion temp., 264 psi, °C. | 105 | 115 | 115 | 115 | 115 |

Reinforced and reinforced impact-modified compositions according to this invention are thereby obtained.

EXAMPLES 31–34

Copolymers are prepared according to the procedure of Example 16, but substituting a polyestercarbonate for the poly(bisphenol-A carbonate) and in two cases, poly(ethylene terephthalate) for poly(1,4-butylene terephthalate). The polyestercarbonate comprises units containing 13% by weight of bisphenol A carbonate, 83% by weight of bisphenol A isophthalate and 4% by weight of bisphenol-A terephthalate. Its I.V. is 0.56 and Tg is 180° C. The formulations used and the I.V.'s and Tg's obtained are set forth in Table 8:

TABLE 8

Copolymers of Polyestercarbonates and Polycarbonates

| Example | 31 | 32 | 33 | 34 |
| --- | --- | --- | --- | --- |
| Composition (parts by weight) | | | | |
| Polyestercarbonate | 90 | 80 | 90 | 80 |
| Poly(1,4-butylene terephthalate) | 10 | 20 | — | — |
| Poly(ethylene terephthalate) | — | — | 10 | 20 |
| Sodium benzene phosphinate | .01 | .01 | .01 | .01 |
| Properties | | | | |
| Intrinsic viscosity, dl/g. | .64 | .69 | .55 | .56 |
| Tg., °C. | 153 | 135 | 154 | 141 |

These can be molded per se or reinforced and impact-modified as described above.

The above-mentioned patents and test methods are incorporated herein by reference.

The foregoing detailed description will suggest many variations to these skilled in this art. For example, instead of using poly(ethylene terephthalate) or poly(1,4-butylene terephthalate) as the poly(alkylene arylate) other compounds, such as poly(cyclohexanedimethanol terephthalate) can be substituted. Instead of phenyl phosphonic acid, meta phosphonic acid, trimesic acid and pyromellitic acid can be used as quenching agents. Conventional additives such as flame retardants, clay, mica, pigments and colorants all can be added in conventional amounts. All such variations are within the full intended scope of the appended claims.

We claim:

1. A process for the preparation of a high molecular weight copolymer which comprises reacting together in the molten state, at a temperature between 245° C. and 315° C. at a time interval between 0.1 minute and 40 minutes, and in the presence of a basic catalyst, a mixture of a high molecular weight polycarbonate selected from poly(dihydric phenol carbonate) or poly(hydric phenol arylate/carbonate) in the proportion of 1 percent to 40 percent of the former to 99 percent to 60 percent of the latter, the resulting copolymer possessing a single glass transition temperature, having substantially no content of poly(alkylene arylate homopolymer and having a ratio of alkylene arylate linkages to dihydric phenol arylate linkages of not substantially less than about 20:1, and then adding to the molten mixture an effective amount of an acidic stabilizing additive selected from phosphorus compounds and carboxylic acids.

2. A process as defined in claim 1 wherein said acidic stabilizing additive is selected from organic phosphites, metaphosphoric acid, arylphosphinic acid and arylphosphonic acid.

3. A process according to claim 1, wherein the poly(alkylene arylate) is a high molecular weight poly(ethylene terephthalate).

4. A process according to claim 1, wherein the poly(alkylene arylate) is a high molecular weight poly(1,4-butylene terephthalate).

5. A process according to claim 1, wherein the poly(alkylene arylate) is a high molecular weight poly(1,4-cyclohexanedimethanol terephthalate).

6. A process according to claim 1, wherein the poly(ethylene terephthalate) has an intrinsic viscosity of at least about 0.5 dl./g.

7. A process according to claim 4, wherein the poly(1,4-butylene terephthalate) has an intrinsic viscosity of at least about 0.50 dl./g.

8. A process according to claim 5, wherein the poly(1,4-cyclohexanedimethanol terephthalate) has an intrinsic viscosity of at least about 0.50 dl./g.

9. A process according to claim 1, wherein the poly(dihydric phenol carbonate) is poly(bisphenol-A carbonate) or the poly(dihydric phenol arylate) is poly(bisphenol-A isoterephthalate carbonate) either having an intrinsic viscosity of at least about 0.45 dl./g.

10. A process according to claim 1, wherein the proportions of high molecular weight poly(alkylene arylate) and of the polycarbonate are from 25 percent to 2 percent of the former to from 75 percent to 98 percent of the latter.

11. A process as defined in claim 1, wherein said catalyst comprises from about 0.0005 to about 0.5 percent by weight of the mixture.

12. A process as defined in claim 1, wherein said basic catalyst comprises a salt of an aryl phosphinic acid.

13. A process as defined in claim 12, wherein said salt is sodium benzene phosphinate.

* * * * *